United States Patent
Rosemann et al.

(10) Patent No.: US 7,207,529 B2
(45) Date of Patent: Apr. 24, 2007

(54) CLAMP FOR HOLDING OF FLAT OBJECTS

(75) Inventors: Frank Rosemann, Münzenberg (DE); Ernst Ludwig Hahn, Rabenau (DE); Hans Peter Seng, Reiskirchen (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 11/364,558

(22) Filed: Feb. 28, 2006

(65) Prior Publication Data

US 2006/0214077 A1 Sep. 28, 2006

Related U.S. Application Data

(63) Continuation of application No. PCT/EP04/09718, filed on Sep. 1, 2004.

(30) Foreign Application Priority Data

Sep. 1, 2003 (DE) ............... 103 40 571.2

(51) Int. Cl.
*F16B 15/00* (2006.01)
(52) U.S. Cl. ....................... 248/71; 248/74.3
(58) Field of Classification Search ............... 248/71, 248/74.1, 74.2, 74.3, 316.5; 24/16 PB; 403/315, 403/316
See application file for complete search history.

(56) References Cited

U.S. PATENT DOCUMENTS

| | | | |
|---|---|---|---|
| 3,090,826 A | 5/1963 | Cochran | |
| 3,163,712 A | 12/1964 | Cochran | |
| 4,356,599 A * | 11/1982 | Larson et al. | 24/16 PB |
| 4,369,946 A * | 1/1983 | Palmer et al. | 248/74.2 |
| 4,457,482 A * | 7/1984 | Kitagawa | 248/74.3 |
| 5,020,749 A | 6/1991 | Kraus | |
| 5,161,759 A | 11/1992 | Burns et al. | |
| 5,367,750 A | 11/1994 | Ward | |
| 6,450,459 B2 | 9/2002 | Nakanishi | |
| 6,561,465 B2 * | 5/2003 | Kondo | 248/74.3 |
| 6,565,049 B2 | 5/2003 | Hahn | |
| 6,809,257 B2 | 10/2004 | Shibuya | |
| 2001/0054671 A1 | 12/2001 | Kondo | |
| 2004/0223805 A1 | 11/2004 | Benedetti et al. | |
| 2004/0240932 A1 | 12/2004 | Benedetti | |
| 2004/0244160 A1 | 12/2004 | Nessel et al. | |

FOREIGN PATENT DOCUMENTS

GB 20922216 * 12/1981 ............ 248/74.2

OTHER PUBLICATIONS

PCT/EP2004/009718 search report dated Dec. 17, 2004.

* cited by examiner

*Primary Examiner*—Ramon O Ramirez
(74) *Attorney, Agent, or Firm*—Harness, Dickey & Pierce, P.L.C.

(57) ABSTRACT

A clamp for holding of films, tape lines or the like consists of an underpart consists of a floor and stops projecting from the floor and arranged at a distance from each other, laterally bounding a holding region, and a top part attached to the underpart and opposed to the floor, an entry opening being provided between the top part and the stop arranged on one side of the holding region. The clamp comprises a lid overreaching the top part in closed position and connected to the underpart by a closure, with which lid the entry opening is closable.

36 Claims, 2 Drawing Sheets

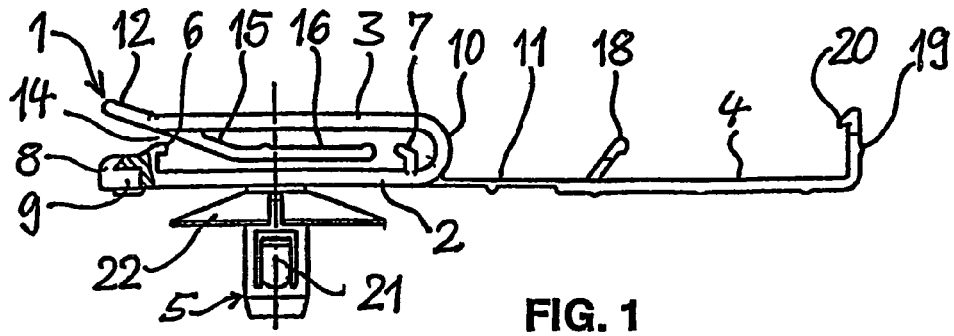
FIG. 1
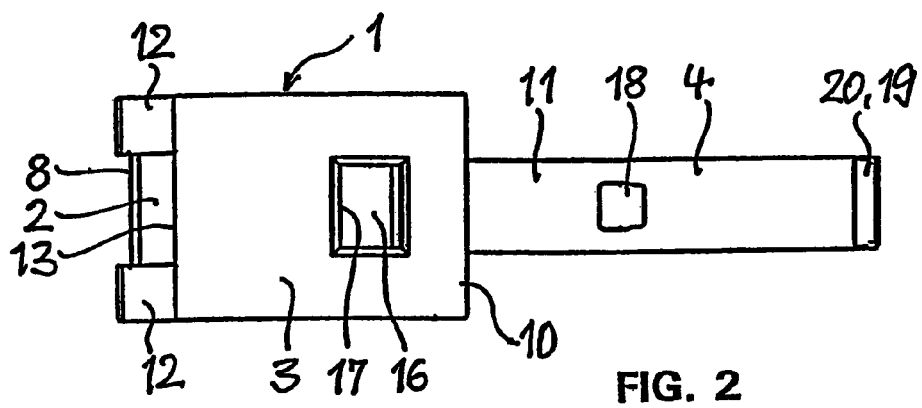
FIG. 2
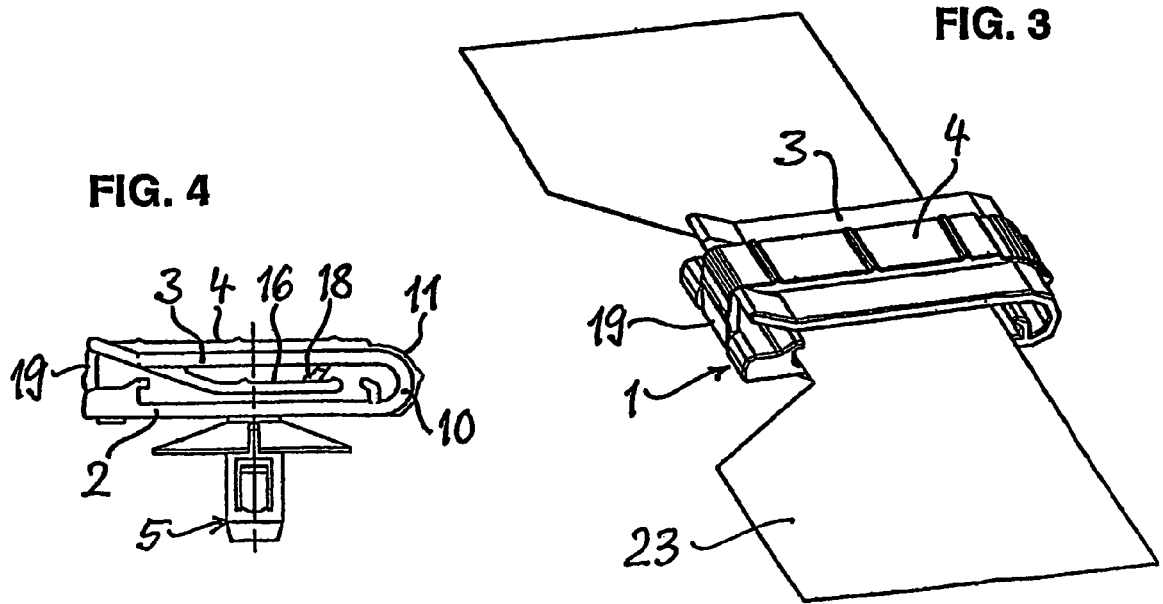
FIG. 3
FIG. 4

CLAMP FOR HOLDING OF FLAT OBJECTS

CROSS-REFERENCE TO RELATED APPLICATIONS

This application is a continuation of PCT patent application Ser. No. PCT/EP2004/009718, filed on Sep. 1, 2004, which claims priority to DE 103 40 571.2, filed on Sep. 1, 2003, both of which are incorporated by reference herein.

BACKGROUND AND SUMMARY

The invention relates to a clamp for holding a flat object, such as films, tape lines or the like, which clamp is provided with an underpart comprising a floor and a top part attached to the underpart opposed to the floor, a holding area having an entrance opening being provided between the underpart and the top part.

Clamps of the kind specified are employed for example in automobiles, where they serve to fasten tape lines or films laminated with electric conductors provided to connect electrical apparatus. Here, the problem arises that in some fastening locations, only a single film or a single tape cable is to be held with a clamp, whereas in some other fastening locations, several films and tape cables come together, likewise to be held with one clamp, insofar as possible. Another problem consists in rendering the installation of the lines as simple as possible, one requirement being to pre-assemble clamps and films or lines, the pre-assembled units to be fastened to the substrates provided for the purpose; but another requirement is that it should be possible to introduce additional films or lines into the pre-assembled and ready-installed clamps without impairing the fixation of the films or lines already present. Furthermore, after completion of the installation, there should be a secure fixation of the films or lines in the clamp.

DE 101 29 833 A1 discloses a clamp for holding a tape cable, comprising a U-shaped base part to accommodate the tape cable, a cover part connected to the base part, a projection extending from the base part, and a contact pressure part arranged on the cover part and holding down the tape cable accommodated by the base part when the cover part is closed. In this tape cable, there is a slot into which the projection of the base part enters. To fasten the clamp, a "clip" is provided on the under side of the base part, insertable in a hole in an automobile body. This known clamp is not suitable for pre-assembly or re-assembly, since after each assembly operation it must be closed completely in each instance in order for the tape cable or cables inserted to be adequately held.

Further, DE 100 35 452 A1 discloses a holding device for fastening conductor film, consisting of a foundation plate attached at the intended location in the automobile and a fixation knob insertable in the foundation plate and comprising a round base and an arm diagonally opposed to the base and having pressure lugs to rest on the conductor film on its under side facing the base. Here, after attachment of the holding device to an automobile, the conductor film, provided with an oblong hole, or several, can be thrust in between the base and the arm, a finger attached to the arm entering an oblong hole and securing the conductor film against being pulled out. With this holding device, only perforated conductor films can be fastened. DE 88 05 815 U1 shows a clamp for holding of cables which clamp comprises an underpart having a fastening element, opposite the underpart a top part having a spring contact pressure element, a lateral opening for inserting the cables, and a lid having a snap-in lock and covering the opening.

The object of the invention is to create a clamp of the kind initially mentioned that makes possible a simple assembly operation, is suitable for accommodating one or several films or tape lines, and does not require any fastening holes or recesses in the films or tape lines. This object is accomplished by the invention specified in claim 1. Advantageous embodiments of the invention are specified in the subsidiary claims. According to the invention, the clamp comprises a floor and, spaced apart and projecting from the floor, stops laterally bounding a holding region, and a top part, an entry opening being provided between the top part attached to the underpart and opposed to the floor, and the stop arranged on one side of the holding region, which opening is closable by a lid reaching over the top part in closed position and connectable to the underpart by means of a closure. In the clamp formed according to the invention, when the lid is open, several film or tape lines can be introduced successively into the then clear entry opening, these being held securely enough for the performance of assembly operations between top part and underpart and by the lateral stops. When all films or tape lines to be held have been placed in the clamp, the lid is closed, thereby effecting the final fixation of the films or tape lines in the clamp. In this way, the problems initially mentioned are solved.

The clamp according to the invention has the advantage that during assembly, with lid opened to secure the films or tape lines, a low clamping force may be provided, and that in connection with the closing of the lid for lastingly securing the films or tape lines, the clamping force can be enhanced to the desired extent. Additional holding means, such as mandrels engaging holes in the films or tape lines, are therefore not required. Preferably, the lid of the clamp according to the invention comprises a pressure element which, when the lid is closed, exerts a clamping force directed towards the floor of the underpart. The pressure element may consist of an elastically deformable finger attached to the under side of the lid, an opening being provided in the top part through which the finger extends towards the floor of the underpart when the lid is closed. When the lid is opened, the clamping force to secure the films or tape lines is preferably generated by a spring contact pressure element extending between floor and top part in the holding region and attached to the top part or to the underpart. Further, provision may be made so that with the lid closed, the pressure element arranged on it will act on the contact pressure element, so that the latter transmits the clamping force of the pressure element to the films or tape lines.

According to a further proposal of the invention, a fastening element is attached to the underpart that serves for fastening the clamp to a substrate. Possible fastening elements are clamps, screws or nuts, as well as rings, eyes or sleeves to be slipped onto bolts or pins and pins insertable in openings. The clamp according to the invention is preferably to be made in one piece out of a synthetic material, the lid being connected to the underpart by a flexion hinge. To hold the lid in a closed position, a snap closure with a catch hook attached to the lid, snapping into a recess on the underpart, is especially suitable.

In a further advantageous embodiment of the invention, the clamp has an interplate extending between the underpart and the top part, separating from each other a holding region located between the underpart and the interplate and an upper holding region located between the top part and the interplate. In this way, several films or tape lines may be held separately from each other and in different ways. Thus, for example, the upper holding region may serve to accommodate films with fastening recesses. For this purpose, preferably the interplate comprises an opening aligned with the opening in the top part, and the pressure element projects through the opening in the top part when the lid is closed and enters the opening in the interplate.

Further, provision may be made for the pressure element to have a segment passing through the opening in the interplate, and in contact with the floor of the underpart when the lid is closed, in order to clamp the film arranged on the underpart firmly. Besides, the pressure element may have a segment that rests in contact with the interplate when the lid is closed and clamps the film in the upper holding region. The pressure element may consist, according to the invention, of an arcuate strip of material configured in one piece with the lid, elastically yielding, and thus providing a lasting clamping effect. Alternatively, the pressure element may consist of a body of elastomer material, positively connected to the lid geometrically or materially.

BRIEF DESCRIPTION OF THE DRAWINGS

The invention will be illustrated below in more detail in terms of an embodiment represented by way of example in the drawing. In the drawing, FIG. 1 shows a side view of a clamp according to the invention, in open position, FIG. 2 shows a view of the clamp according to FIG. 1 from above, FIG. 3 shows a perspective representation of the closed clamp with a film held in the clamp, FIG. 4 shows a side view of the closed clamp.

DETAILED DESCRIPTION

Figure 5:
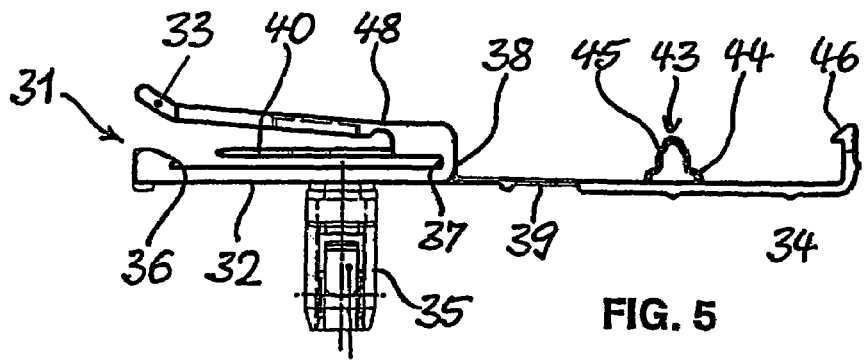
FIG. 5 shows a side view of a second embodiment of a clamp according to the invention, in open position.
Figure 6:
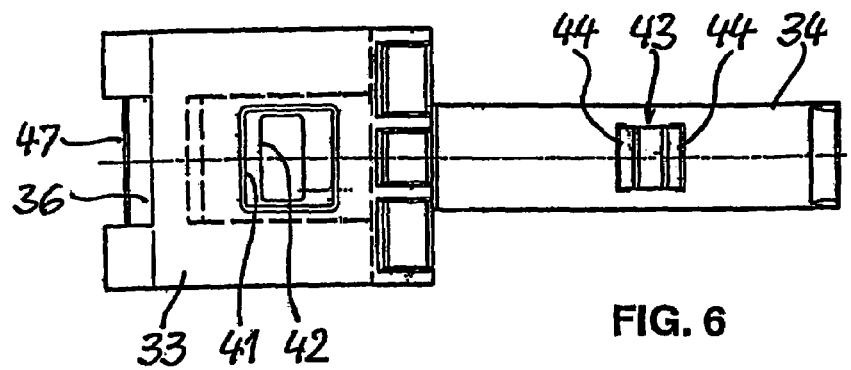
FIG. 6 shows a view of the clamp according to FIG. 5 from above.

The clamp 1 shown comprises a plate-like underpart 2, a plate-like top part 3 at a parallel distance therefrom, a strip-like lid 4, and a fastening element 5 connected to the underpart 2. The clamp 1 is made in one piece out of a synthetic material. In departure from this, however, it is possible alternatively to make the fastening element 5 as a separate part, and then connect it to the underpart 2 by suitable means.

On the bottom of the underpart 2 facing the top part 3, ledge-like stops 6, 7 are configured on the former, located at a parallel distance from each other and serving for lateral bounding of the layer of objects held on the underpart 2, such as films, tape lines or the like. The upper ends of the stops 6, 7 are provided with hooks bent towards each other. The lateral ends of the underpart 2 neighboring upon the stop 6 comprises, in the middle, a recess 8 into which the fastening end of the lid enters. The recess 8 is provided with an undercut 9 on its under side.

The lateral end of the underpart 2 neighboring upon the stop 7 passes over into the top part 3 by way of a hemicylindrical wall segment 10. On the wall segment 10, furthermore, in prolongation of the underpart 2, a flexion hinge 11 in the form of an elastically deformable strip of material of small thickness is formed on, by which the lid 4 is held. The top part 3 extends at a distance from the stops 6, 7 and is provided at its free end with tabs 12 forming an angle of about 160° with the top part 3. Between the bent tabs 12, the top part 3 ends over the stop 6, forming a lateral recess 13 bounded by the bent tabs 12 to accommodate the lid 4. The bent tabs 12 serve to facilitate the introduction of films or tape lines into the entry opening 14 present between the top part 3 and the stop 6.

On the under side of the top part 3, with the aid of a connecting segment 15 located in the plane of the bent tabs 12, a spring contact pressure element 16 extending between the top part 3 and the underpart 2 is arranged, which guides the films or tape lines when brought into the clamp 1 towards the stop 7 with a guided surface, and presses them against the floor of the underpart 2. Above the free end portion of the contact pressure element 16, there is a rectangular opening 17 in the top part 3 to accommodate a pressure element 18 arranged on the lid 4.

The lid 4, in new condition of the clamp 1, is in the position shown in FIG. 1, in which it extends more or less in the same plane as the underpart 2. In the neighborhood of its fastening end, the pressure element 18, in the form of a finger extending upward at an angle of about 50° to the lid, is attached to the lid 4. The free end of the lid 4 is provided with a fastening link 19 bent at right angles, which bears a catch hook 20 at its end, snapping into the undercut 9 of the recess 13.

The fastening element 5, in the embodiment shown by way of example, consists of a pin-shaped "clip," insertable in a hole in a sheet-metal wall and securable in the hole with the aid of locking fingers 21. A washer-like flange 22 forms a contact surface for the sheet metal and provides a defined orientation of the clamp 1 to the sheet-metal surface. The flange 22 is elastically deformable in axial direction, achieving a clamping of the fastening element 5 to the sheet metal without play and permitting equalization of dimensional tolerances.

In FIGS. 3 and 4, the clamp 1 is shown in closed condition, a film 23 being held by the clamp 1 in FIG. 3. In closed condition of the clamp 1, the lid 4 grips around the top part 3; the link 19 engages the recess 8, and the catch hook 20 snapping into the undercut holds the lid 4 in that position. The pressure element 18 in the closed position extends through the opening 17 in the top part 3, and its end exerts pressure on the contact element 16, loading it additionally in the direction of the underpart 2 and clamping the film or tape line, or several of them, resting on the floor of the underpart 2. Before closing of the lid 4, the pressure element 16 with its limited spring rigidity alone effects the retention of the films or tape lines introduced, the contact force being so designed that mounting on several films successively is possible without difficulty. Besides, the holding force of the contact pressure element is sufficient so that the clamp can be pre-assembled on a tape conductor or film belt, and then the belt with pre-assembled clamp can be mounted on the substrate provided. After mounting of the clamp on the substrate, additional films or tape lines may be inserted in the clamp. Only then will the lid be closed to finally clamp the inserted films or tape lines and secure them in place.

FIGS. 5 to 8 show an embodiment of a clamp 31 suitable for accommodating and fastening two different types of film. The clamp 31 is very similar to the clamp 1 in its basic structure. Like the latter, it comprises an underpart 32, a top part 33, a lid 34 and a fastening element 35. On the narrow side of the underpart 32, stops 36, 37 are provided, located opposed to each other and extending in the direction of the top part 33, between which a film, tape line or the like can be arranged on the underpart 32. The stop 37 is formed by a wall segment 38 connecting the underpart 32 to the top part 33. The lid 34 is fixed on the outside of the wall segment 38 with the aid of a flexure hinge 39. The entry opening 14 is arranged between the top part 33 and the stop 36.

Between the underpart 32 and the top part 33, an interplate 40 extends substantially parallel thereto, fixed by one end to the top part 33 near the wall segment 38. The interplate 40, in its center, comprises a rectangular opening 41. Over the opening 41, in the top part 33, there is a rectangular opening 42, whose length substantially matches the length of the opening 41, but whose width is greater than the width of the opening 41. The opening 42 is so arranged relative to the opening 41 that, viewed from above, the long sides of the opening 41 lie at a distance from the long sides of the opening 42 within the opening 42. The interplate 40 terminates at a distance from the stop 36, forming an opening for access to the lower holding region of the clamp 31.

On the under side of the lid 34, a pressure element 43 is attached, consisting of a rectangular strip of material whose narrow end edges are so formed onto the lid 34 at a distance from each other that the strip of material spans the lid segment extending between its narrow end edges in the manner of an arch. In the strip of material, kinks are provided opposed to each other and directed towards the center of the arch, which lend the pressure element 43 a step shape with a wider segment 44 neighboring upon the lid 34 and a narrower segment 45. The pressure element 43 is so arranged on the lid 34 that upon closing of the lid 34, it reaches through the opening 42 in the top part 33 into the space between the top part 33 and the underpart 32, its narrower segment 45 passing through the opening 41 in the interplate 40 and coming to rest on the floor of the underpart 32. The wider segment 44 of the pressure element 43 comes to rest against the edge of the interplate 40 on either side of the opening 41. The pressure element 43 is elastically deformable, and its length is made great enough so that when the lid 34 is closed, it is compressed somewhat, and accordingly, with the lid closed, rests in contact with spring action against the underpart 32 and/or the interplate 40, or against the films or tape lines arranged on them. The lid 34 in closed position, as in the previous example, is held by a catch hook 46, engaging an undercut recess 47 in the underpart 32.

Figure 8:
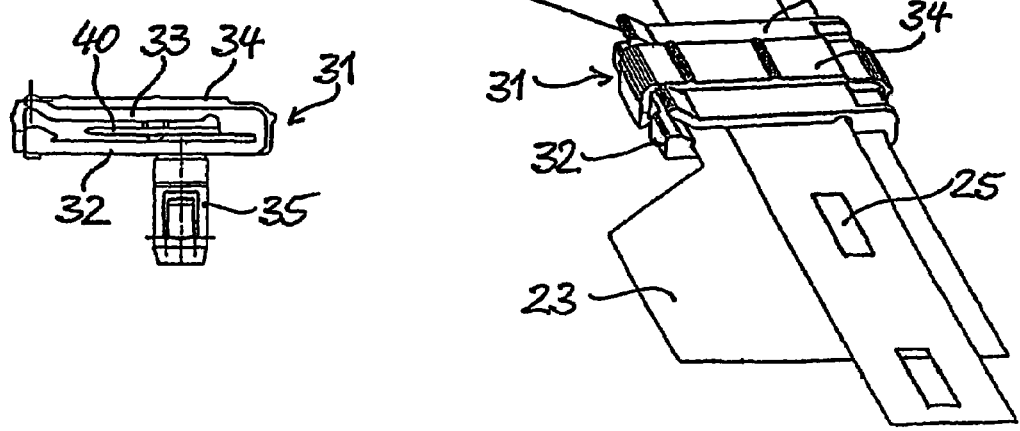
FIG. 8 shows the closed clamp according to FIG. 4 in side view.

The free end of the interplate 40 is located at a distance from the stop 36, to facilitate introduction of films into the lower accommodating region between interplate 40 and underpart 32. The introduction of the films into the upper region between the interplate 40 and the top part 34 is facilitated by an arrangement of the top part 33 at an angle of about 5° to the plane of the interplate 40, which takes the top part 33 in when the lid 34 is opened. Upon closing of the lid 34, the top part 33, as may be seen in FIG. 8, is brought into a position parallel to the interplate 40 and to the underpart 32. This is made possible by a reduction of cross-section 48 configured at the fastening end of the top part 33 and facilitating the flexure.

Figure 7:
FIG. 7 shows a perspective representation of the closed clamp according to FIG. 4, with film held in the clamp.

As may be seen in FIG. 7, films or tape lines without recesses or fastening holes as well as those with recesses or fastening holes can be held with the clamp 31. In the lower accommodating region between the underpart 32 and the interplate, a film 23 having no recesses is held. The film 23 is positively supported geometrically on the stops 36, 37 transverse to their lengthwise extent, and is pressed against the underpart 32 by means of the pressure element 43, thus clamping it. In like manner, alternatively several films of small thickness can be held in the lower holding region. The upper holding region between the interplate 40 and the top part 33 is intended for fastening perforated films 24 or tape lines. These are so arranged in the upper holding region that when the lid is closed, the segment 45 of the pressure element 43 passes through one of the holes 25, thereby positively fixing the film geometrically in the clamp. Besides, the film 24 is clamped between the segment 44 of the pressure element 43 and the interplate 40 at two opposed edges of the hole 41, so that it is secured against soiling. In the upper holding region also, several perforated films can be accommodated.

The invention claimed is:

1. A clamp system comprising:
 a substantially flat object; and
 a clamp including an underpart comprising a floor and stops arranged at a distance from each other and from the floor, laterally bounding a holding region, and a top part attached to the underpart opposed to the floor, an entry opening located between the top part and the stop arranged on one side of the holding region, the entry opening being closable by a lid reaching over the top part and connectable to the underpart;
 the substantially flat object being secured between the underpart and the top part.

2. The clamp system according to claim 1, wherein the lid comprises a pressure element which, when the lid is closed, generates a clamping force directed towards the floor of the underpart.

3. The clamp system according to claim 2, wherein the pressure element includes an elastically deformable finger attached to the under side of the lid.

4. The clamp system according to claim 2, wherein an opening is located in the top part, through which the pressure element extends when the lid is closed in the direction of the floor of the underpart.

5. The clamp system according to claim 1, further comprising a spring contact pressure element extending into the holding region between the floor of the underpart and the top part.

6. The clamp system according to claim 5, wherein the contact pressure element is attached to the top part.

7. The clamp system according to claim 5, wherein the contact pressure element comprises a guide surface by which the object is guided in the holding region when brought into the clamp.

8. The clamp system according to claim 5, wherein the pressure element acts on the contact pressure element when the lid is closed.

9. The clamp system according to claim 1, further comprising a fastening element attached to the underpart.

10. The clamp system according to claim 1, wherein the lid is connected to the underpart by a flexure hinge.

11. The clamp system according to claim 1, further comprising a snap closure having a catch hook attached to the lid, snapping into a recess in the underpart, to hold the lid in the closed position.

12. The clamp system according to claim 1, wherein the entire clamp is a one piece synthetic material, and the clamp is attached to an automotive vehicle.

13. The clamp system according to claim 1, further comprising an interplate extending between the underpart and the top part and separating from each other a lower holding region located between the underpart and the interplate, and an upper holding region located between the top part and the interplate, the object being located between the interplate and the underpart.

14. The clamp system according to claim 13, wherein the interplate has a first opening aligned with a second opening in the top part, and the pressure element is arranged on the lid to protrude through the second opening in the top part and enters the first opening in the interplate.

15. The clamp system according to claim 14, wherein the pressure element comprises a segment passing through the first opening in the interplate and resting on the floor of the underpart when the lid is closed.

16. The clamp system according to claim 14, wherein the pressure element comprises a segment resting on the interplate when the lid is closed.

17. The clamp system according to claim 1, further comprising a pressure element including an arcuate strip of material configured in one piece with the lid.

18. The clamp system according to claim 1, further comprising a pressure element including a body of elastomeric material positively connected materially to the lid.

19. A clamp system comprising:
an underpart including a substantially flat middle segment;
a top part including a substantially flat middle segment, the middle segments being elongated toward an opening and substantially parallel to each other;
an interplate including an elongated segment substantially parallel to the middle segment of the underpart, the interplate being spaced away from both the middle segments of the underpart and the top part; and
a lid flexibly coupled to at least one of the underpart and the top part, by a hinge, the lid including a fastener operably engaging a fastener of the underpart.

20. The clamp system according to claim 19, wherein the underpart, top part and interplate are all a unitary polymeric material.

21. The clamp system according to claim 19, wherein one of the fasteners is a hook.

22. The clamp system according to claim 19, wherein the lid further comprises a pressure element projecting from an elongated middle segment of the lid, the pressure element contacting against the interplate when the lid is closed.

23. The clamp system according to claim 19, further comprising a substantially flat, automotive vehicle object temporarily secured between the underpart and the top part when the lid is open, the object being more secured when the lid is closed, and the object being removable when the lid is reopened.

24. A clamp system comprising:
an underpart including a substantially flat middle segment;
a top part including a substantially flat middle segment, the middle segments being elongated toward an opening and substantially parallel to each other;
an interplate including an elongated segment substantially parallel to the middle segment of the underpart, the interplate being spaced away from both the middle segments of the underpart and the top part; and
at least a pair of lead-in tabs extending from the middle segment of the top part in an offset angled manner adjacent the opening, and a recess located between the tabs.

25. The clamp system according to claim 24, further comprising a lid partially located in the recess when the lid is closed, the lid blocking the opening when closed, and the lid allowing access through the opening when open.

26. A clamp system comprising:
an underpart including a substantially flat middle segment;
a top part including a substantially flat middle segment, the middle segments being elongated toward an opening and substantially parallel to each other; and
an interplate including an elongated segment substantially parallel to the middle segment of the underpart, the interplate being spaced away from both the middle segments of the underpart and the top part;
wherein the middle segment of the top part includes a hole, further comprising a fastener projecting from the underpart, the fastener including at least one locking finger.

27. A clamp system comprising:
a substantially U-shaped member comprising a first leg and a spaced apart second leg coupled by a crotch, an intermediate leg located between the first and second legs, the first leg including a hole; and
a lid rotatably coupled to the member adjacent the crotch, the lid comprising a fastener and a pressure element, the fastener removably engaging the second leg when the lid is closed, the pressure element extending through the hole in the first leg when the lid is closed.

28. The clamp system according to claim 27, further comprising a substantially flat, automotive vehicle object temporarily secured between the first and second legs when the lid is open, the object being more secured when the lid is closed, and the object being removable when the lid is reopened.

29. The clamp system according to claim 27, wherein the pressure element extends through an aperature in the intermediate leg when the lid is closed.

30. The clamp system according to claim 27, wherein the pressure element biases the intermediate leg toward the second leg when the lid is closed.

31. The clamp system according to claim 27, further comprising at least a pair of lead-in tabs extending from the first leg in an offset-angled manner adjacent an opening, a recess located between the tabs, a portion of the lid located in the recess when the lid is closed, the lid blocking the opening when closed, and the lid allowing access through the opening when open.

32. The clamp system according to claim 27, wherein the legs and the lid are all a unitary polymeric material.

33. A method of holding a substantially flat object to an automotive vehicle, the method comprising:
(a) creating a unitary clamp from a polymeric material;
(b) preassembling the object by inserting the object between substantially parallel legs of the clamp;
(c) attaching the clamp to the vehicle while a lid remains open to allow access between the legs, after step (b); and
(d) closing the lid, after step (c), to block access between the legs.

34. The method according to claim 33, wherein the object is secured to the clamp free of a perforation in the object.

35. The method according to claim 33, further comprising applying pressure against an interplate, located between the legs, when the lid is closed, the object being located between the interplate and one of the legs opposite the lid.

36. The method according to claim 33, further comprising inserting a second substantially flat object between the legs after the clamp is attached to the vehicle and before the lid is closed.

* * * * *